United States Patent
Harkema et al.

(10) Patent No.: US 12,458,803 B2
(45) Date of Patent: Nov. 4, 2025

(54) SYNC PULSE DETECTOR

(71) Applicant: UNIVERSITY OF LOUISVILLE RESEARCH FOUNDATION, INC., Louisville, KY (US)

(72) Inventors: Susan J. Harkema, Louisville, KY (US); Yangsheng Chen, Louisville, KY (US); Douglas J. Jackson, New Albany, IN (US); Manikandan Ravi, Louisville, KY (US); Claudia Angeli, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 857 days.

(21) Appl. No.: 17/670,025

(22) Filed: Feb. 11, 2022

(65) Prior Publication Data

US 2022/0339450 A1    Oct. 27, 2022

Related U.S. Application Data

(63) Continuation of application No. 15/752,294, filed as application No. PCT/US2016/047542 on Aug. 18, 2016, now abandoned.
(Continued)

(51) Int. Cl.
*A61N 1/08* (2006.01)
*A61B 5/00* (2006.01)
(Continued)

(52) U.S. Cl.
CPC ........ *A61N 1/36167* (2013.01); *A61B 5/0031* (2013.01); *A61B 5/313* (2021.01); *A61B 5/395* (2021.01); *A61N 1/36135* (2013.01); *A61N 1/37223* (2013.01); *A61N 1/37282* (2013.01); *A61N 1/378* (2013.01)

(58) Field of Classification Search
CPC .. A61N 1/08; A61N 1/37235; A61N 1/37252; A61N 1/37288
See application file for complete search history.

(56) References Cited

U.S. PATENT DOCUMENTS

| | | | |
|---|---|---|---|
| 4,883,065 A | 11/1989 | Kelen | |
| 5,601,089 A | 2/1997 | Bledsoe et al. | |

(Continued)

FOREIGN PATENT DOCUMENTS

| | | |
|---|---|---|
| CN | 101505827 | 8/2009 |
| CN | 101856540 | 10/2010 |

(Continued)

OTHER PUBLICATIONS

EP 16837833.9, European Patent Office, Examination Report, 4 pgs. May 31, 2022.
(Continued)

*Primary Examiner* — Allen Porter
(74) *Attorney, Agent, or Firm* — Brian W. Chellgren; Gerald W. Roberts; Dentons Bingham Greenebaum LLP

(57) ABSTRACT

Disclosed herein are devices and methods used with neurostimulation therapy for spinal cord injury. More particularly, embodiments of the present invention relate to a sync pulse detector and methods for synchronizing signals from an implanted neurostimulator with measured physiological responses and other data.

11 Claims, 2 Drawing Sheets

Related U.S. Application Data

(60) Provisional application No. 62/206,447, filed on Aug. 18, 2015.

(51) Int. Cl.
*A61B 5/313* (2021.01)
*A61B 5/395* (2021.01)
*A61N 1/36* (2006.01)
*A61N 1/372* (2006.01)
*A61N 1/378* (2006.01)

(56) References Cited

U.S. PATENT DOCUMENTS

| | | | |
|---|---|---|---|
| 7,844,333 | B1 | 11/2010 | Koh et al. |
| 2005/0090756 | A1* | 4/2005 | Wolf ............... A61B 5/30 607/48 |
| 2010/0222845 | A1 | 9/2010 | Goetz |
| 2011/0257509 | A1* | 10/2011 | Olsen ............... A61B 5/055 600/411 |
| 2013/0053926 | A1 | 2/2013 | Hincapie Ordonez et al. |
| 2014/0163639 | A1* | 6/2014 | Zhu ............... A61B 5/7221 607/46 |
| 2016/0008601 | A1 | 1/2016 | Meadows |
| 2016/0191084 | A1* | 6/2016 | Kim ............... H04L 7/04 375/295 |

FOREIGN PATENT DOCUMENTS

| | | |
|---|---|---|
| CN | 103180012 | 6/2013 |
| CN | 103608069 | 2/2014 |
| CN | 104096313 | 10/2014 |
| CN | 104302354 | 1/2015 |
| JP | 2010502282 | 1/2010 |

OTHER PUBLICATIONS

CN 201680059679.9, China Patent Office, Search Report, 2 pgs. Apr. 25, 2022.
CN 201680059679.9, China Patent Office, First Office Action, 15 pgs. Jun. 24, 2020.
CN 201680059679.9, China Patent Office, Second Office Action, 9 pgs. Apr. 14, 2021.
CA 3033942, Canadian Intellectual Property Office, Office Action, 3 pgs. Oct. 28, 2022.

* cited by examiner

SYNC PULSE DETECTOR

This application is a continuation of U.S. patent application Ser. No. 15/752,294, filed Feb. 13, 2018, which is a 35 U.S.C. § 371 national stage filing of international patent application serial no. PCT/US2016/047542, filed Aug. 18, 2016, which claims the benefit of U.S. provisional patent application Ser. No. 62/206,447, filed Aug. 18, 2015, all of which are incorporated herein by reference.

FIELD OF THE INVENTION

Embodiments of the present invention relate to devices and methods used with neurostimulation therapy for spinal cord injury. More particularly, embodiments of the present invention relate to a sync pulse detector and methods for synchronizing signals from an implanted neurostimulator with measured physiological responses and other data.

BACKGROUND

Serious spinal cord injuries (SCI) result in partial (incomplete) or substantially complete loss of sensory motor function below the level of the spinal lesion. For individuals with incomplete loss of motor function, substantial recovery of standing and stepping recovery has been demonstrated with task specific physical rehabilitation training. Recently, task specific physical rehabilitation training has been combined with epidural stimulation (ES) of the spinal cord in patients with incomplete and complete motor paralysis. High density epidural stimulating electrode arrays can provide spatially selective stimulation to regions of the spinal cord to facilitate or cause muscle movement.

SCI and other conditions may benefit from the delivery of stimulus intended to enable or excite multiple neurological responses using an implantable neurostimulator. A targeted neurological function, may respond to a particular electrical stimulus or waveform at a specific location, amplitude, frequency, pulse width or a combination thereof. For example, a patient's blood pressure may respond to a specific waveform applied to a specific location on the spine. Other functions, such as muscle flexon, may require a different waveform to be applied to a different location to produce the desired response. It is critical that measured physiological data, such as electromyogram (EMG) data showing the electrical potential generated by muscles, and other measured data, such as a patient's blood pressure, be temporally synchronized with neurostimulation signals to accurately correlate stimulation parameters to desired physiological responses.

The industry commonly uses two different methods for managing temporal synchronization. The first method includes placing two EMG sensors symmetrically lateral to the stimulator electrode array incision site over the paraspinal muscles. EMG data is reviewed and stimulation artifacts (e.g., errant peaks) in the data can be identified to mark the onset of the stimulation pulse. However, stimulation artifacts can be difficult to identify in noisy EMG data.

The second method for managing temporal synchronization utilizes a portable pulse detector physically placed between the implanted neurostimulator and an external receiver used by a technician to transmit and receive electronic data to and from the neurotransmitter. Typical wireless communication systems for electronic data are packet-based and use a series of steps such as establishing a link, sending data packet, sending an acknowledgment receipt, and resending data if a previous step failed. This process is intended to send error-free data, but resending data packets introduces variability into the timing of sending individual packets, making it difficult to obtain precise data timing. Typical wireless communication systems for electronic data often use a preamble signal to stabilize a receiver circuit or initialize a decoder circuit so that a signal can be recognized from background noise. Use of preamble signals may introduce further variable latency into the system. As such, this method of temporal synchronization can be inaccurate due to variable delay in detected signals. A need exists for a device and method capable of cleanly and accurately synchronizing measured physiological and other data with signals generated by an implanted neurostimulator or other implanted medical device.

SUMMARY

Disclosed herein are sync pulse detectors and methods for synchronization using a sync pulse detector. In some embodiments, the sync pulse detector is configured to detect an electromagnetic signal from an implanted device, such as an implanted neurostimulator capable of emitting an electromagnetic signal. In some embodiments, a method for synchronizing includes providing an electromagnetic pulse generator as a component of a neurostimulator implanted in a patient, providing an electromagnetic pulse detector external to the patent, generating an electromagnetic pulse using the electromagnetic pulse generator, and detecting the electromagnetic pulse using the electromagnetic pulse detector.

The sync pulse detector provides a dedicated, low latency, wireless link with an implanted neurostimulator or other implanted device, allowing accurate synchronization between timing of stimuli initiated by the implanted device and physiological responses or other data. In contrast to existing methods, systems and devices, the disclosed sync pulse detector and synchronization system utilizing the same uses a simple electromagnetic pulse with no preamble or data formatting that would introduce variably latency. Furthermore, the sync pulse detector does not use the same channels of communication as a standard data-delivering Medical Implant Communication Service (MICS) band radio link communication, such that the sync pulse detector and MICS may be used simultaneously.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
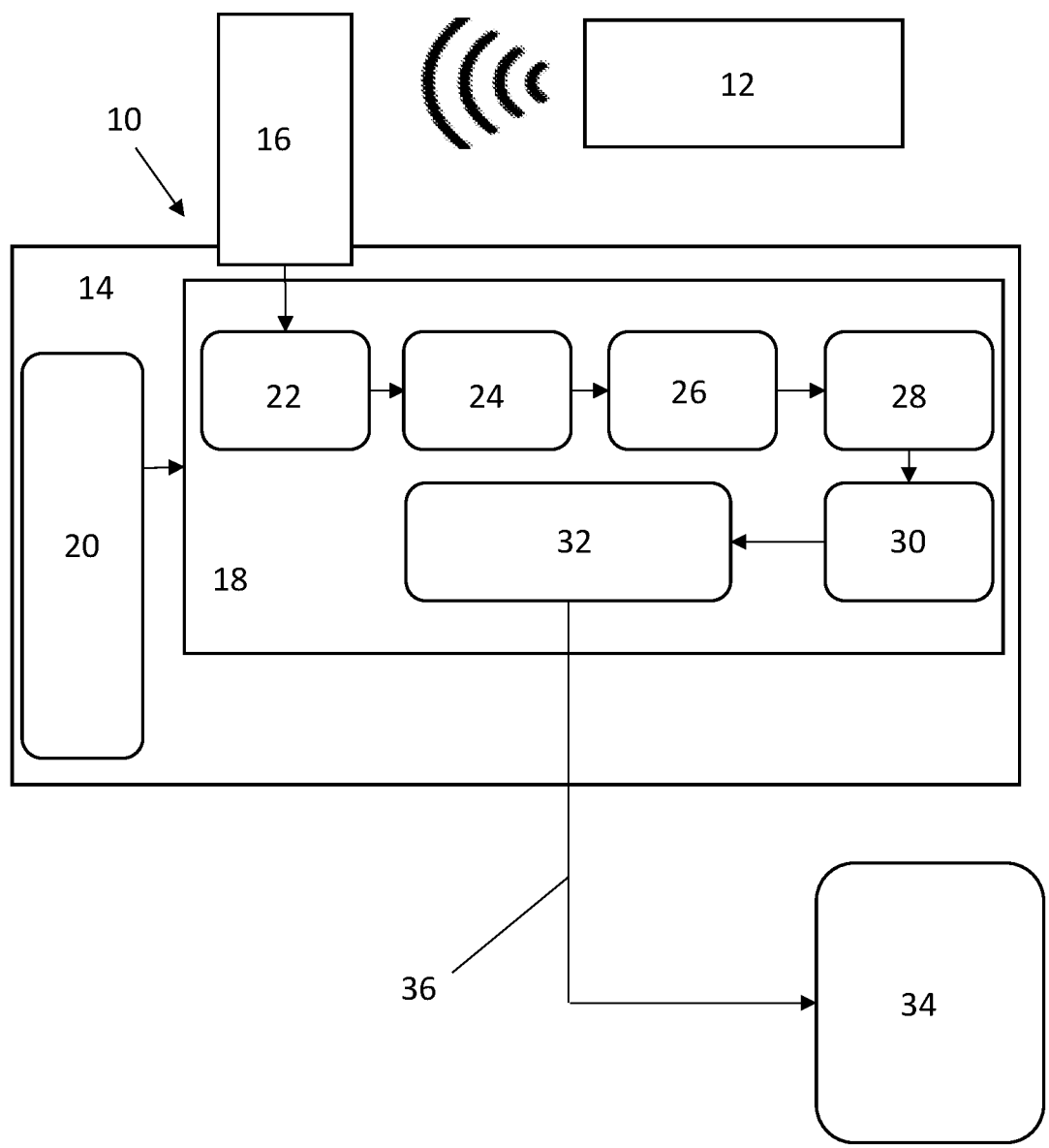
FIG. 1 is a diagram of a sync pulse detector.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document herein is a reference to an embodiment of a family of inventions, with no single embodiment including features that are necessarily included in all embodiments, unless otherwise stated. Further, although there may be references to "advantages" provided by some embodiments of the present invention, it is understood that other embodiments may not include those same advantages, or may include different advantages. Any advantages described herein are not to be construed as limiting to any of the claims.

Specific quantities (spatial dimensions, angles, dimensionless parameters, etc.) may be used explicitly or implicitly herein, such specific quantities are presented as examples and are approximate values unless otherwise indicated. Discussions pertaining to specific compositions of matter are presented as examples and do not limit the applicability of other compositions of matter, especially other compositions of matter with similar properties, unless otherwise indicated.

In some embodiments, the present invention comprises a sync pulse detector. FIG. 1 illustrates a block diagram of an embodiment of a sync pulse detector 10. The sync pulse detector receives a signal from an implanted device 12, such as an implanted pulse generator (IPG) implanted in a human patient, the implanted device being capable of generating a detectable electromagnetic signal. Preferably, the detectable electromagnetic signal is a dedicated, non-packet based signal generated by a single pulse of the IPG. In some embodiments, the sync pulse detector comprises a housing 14, a receiver 16, a circuit 18, and a power supply 20. The receiver 16 is configured to detect an electromagnetic signal and, in some embodiments, is an inductive coil housed within the housing 14 or extending at partially from the housing 14. The circuit 18 is operatively connected to the power supply 20, such as a battery, and the receiver 16. In some embodiments, the circuit 18 comprises a pre-amplifier 22, full wave rectifier 24, reservoir capacitor 26, common mode voltage rejection 28, amplifier 30, and controller 32, such as a microprocessor, each of which is individually known to those skilled in the art. The circuitry 18 further includes components used to regulate voltage of current received from the power source 20 and delivered to circuit components 22, 24, 26, 28, 30, 32, as known in the art. In some embodiments, the circuitry further includes non-transitory computer readable storage media, such as computer memory. After an electromagnetic signal is received by the receiver 16, the signal is passed through the circuit components 22, 24, 26, 28, 30, 32 in the sequence shown in FIG. 1, which converts the analog signal into a digital square wave. The square wave is then transmitted from the sync pulse detector 10 to a receiving device 34, such as a technical user interface used to monitor and control the implanted device 12. In some embodiments, the received analog signal may be converted into a triangle wave, sawtooth wave, or other digital wave as known in the art.

The sync pulse detector 10 further includes means for transmitting the received signal, after conversion from an analog signal into a digital signal, to a receiving device 34. The means for transmitting the signal is preferably an electrical conductor 36 extending between the sync pulse detector 10 and a receiving device 34, such as a coaxial cable or other wired connection physically connecting the sync pulse detector 10 and receiving device 34.

In other embodiments, the means for transmitting may be a wireless connection between the sync pulse detector 10 and the receiving device 34. However, typical wireless communications are packed-based, and use of packet-based wireless communications would introduce variable latency into the transmission and are therefore not preferred.

The sync pulse detector described herein is typically capable of detecting an analog electromagnetic signal generated from an implanted device and reporting detection to a receiving device within approximately one millisecond. In contrast, typical packet-based wireless communication systems for reporting electronic data from an implanted device have latencies within the range of about ten milliseconds to about one hundred milliseconds.

In some embodiments, the sync pulse detector 10 includes audible or visual indicators to alert a user when an electromagnetic signal is detected. In certain embodiments, the sync pulse detector 10 includes one or more light emitting diodes which activate when an electromagnetic signal is detected.

Although the sync pulse detector is primarily designed to synchronize the timing of an IPG or other implanted device, characteristics of the signal detected by the sync pulse detector can be used to provide data regarding the operation of the implanted device. Variation in the amplitude and pulse width of the detected pulse can be used to deliver additional information from the IPG. For example, a 5V pulse can indicate the beginning of delivery of a program of epidural stimulation to a patient and a 2V pulse can indicate the change in the stimulation amplitude in an electrode active in the stimulation program. Such information will aid a technician operating a technical user interface in matching the change of stimulation pattern with the other measured physiological data from the patient, such as EMG, blood pressure etc. For clarification, the sync pulse generated by the IPG and detected by the sync pulse detector is a dedicated signal used for communication purposes and not for delivered to the patient via an electrode for epidural stimulation or other therapeutic purpose.

Figure 2:
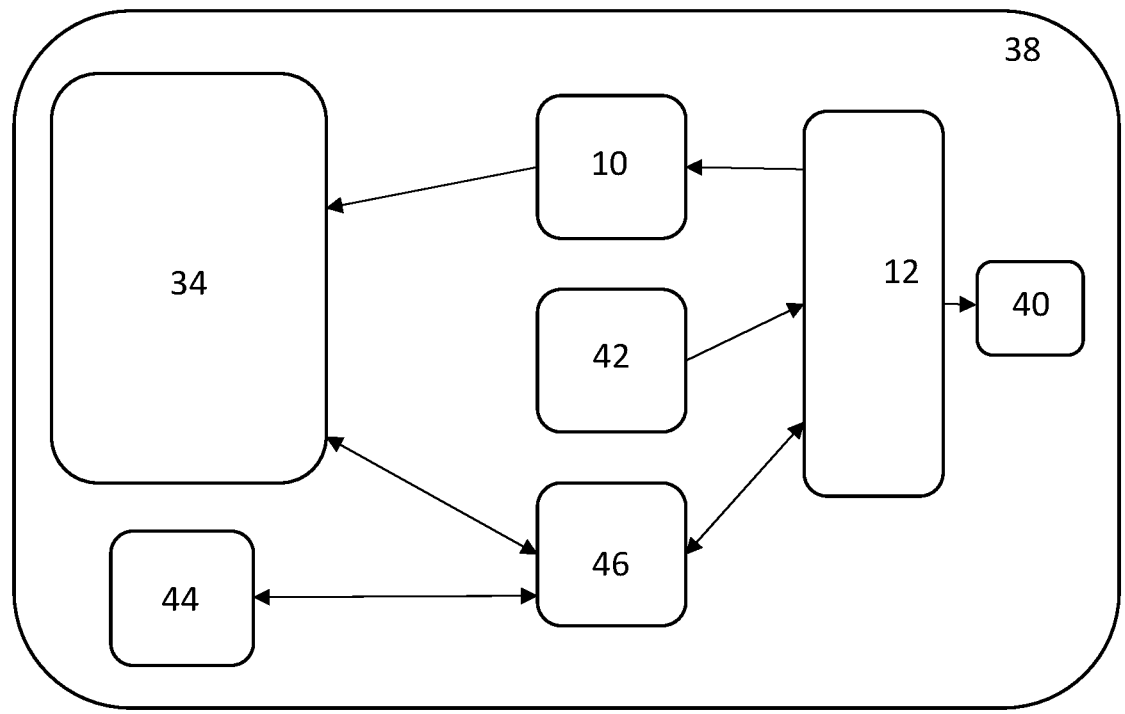
FIG. 2 is a diagram of a system for detecting signals from an implanted device.

Referring now to FIG. 2, the sync pulse detector 10 may be used as part of a system and method for detecting electromagnetic pulses generated by an implanted device 12, such as an implanted electromagnetic pulse generator used in SCI therapy. In the depicted embodiment, the implanted device 12 is an IPG, coupled to an electrode array 40. The implanted device 12 applies an electric pulse to an inductive coil to generate an electromagnetic pulse detectable external to the patient in which the implanted device 12 and electrode array 40 are implanted. This electromagnetic pulse is preferably a dedicated pulse which is not delivered to the patient via the electrode array 40. In some embodiments, the electromagnetic pulse is generated at the beginning of the epidural stimulation or other electrical stimulation. In some embodiments, the electromagnetic pulse is generated when stimulus parameters are set or adjusted. In some embodiments, the battery charging coil of the IPG or a separate inductive coil of the IPG may serve as the coupling coil in communication with the sync pulse detector 10.

In the system depicted in FIG. 2, the sync pulse detector 10 is inductively coupled to the implanted device 12 capable of generating a detectable electromagnetic signal. In this embodiment, the implanted device 12 is an IPG, and it and the sync pulse detector 10 are components of a neurostimulation system 38. The neurostimulation system 38 includes components implanted in a patient, including the implanted device 12 and an electrode array 40 for providing electrical stimulation to the patient. The neurostimulation system 38 further includes components external to the patient, including the sync pulse detector 10, the receiving device 34, a charger 42 for remotely charging the implanted device 12 via induction, and a patient user interface 44 (PUI), a portable dedicated computing device, smartphone, or other portable computing device running software communicatively coupled to the implanted device 12, and a base station 46 providing MICS communications between the implanted device 12 and the receiving device 34 and PUI 44. The sync pulse detector 10 is preferably in wired connection to a receiving device 32. In this embodiment, the receiving device 34, is a technical user interface, a general purpose computer or dedicated computing device running software capable of analyzing signals originating from the implanted device 12. In some embodiments, the different characteristics of signals emitted from the implanted device 12, such as the voltage of the emitted signal, can be used to identify different information from the implanted neurostimulator.

The receiving device 34 receives a synching signal from the implanted device 12, via the sync pulse detector 10, and simultaneously receives physiological data from the patient, such as blood pressure data, electromyogram data, or other data. For example, the receiving device 34 may receive a synching signal at time=0, indicating the initiation of a first stimulation program delivering electrical stimulation to a patient's spinal cord, then may record a first muscle contraction in the streaming electromyogram data at time=10 milliseconds. In a subsequent test, the receiving device 34 may receive a synching signal at time=0, indicating the initiation of a second, different stimulation program, then may record a second, different muscle contraction at time=15 milliseconds. When designing a complex pattern of electrical stimulation, such as, for example, providing patterns of electrical stimulation to a patient's quadriceps, hamstring, and calf muscles to facilitate walking, precise timing of the muscle contractions is necessary to product an effective and functional walking gait. Synchronization data indicating that the first stimulation program results in muscle contraction after a 10 millisecond delay and the second stimulation program results in muscle contraction after a 15 millisecond delay aids a technician in designing a stimulation pattern involving contraction of the two muscles in a specific timing sequence. This feat of designing stimulation patterns is made significantly more difficult using existing packet-based wireless communications for synchronization, as such communications may introduce variable delays of about 10 milliseconds to about 100 milliseconds, increasing the difficulty of determining the delay between providing an electrical stimulation and generating a muscle contraction from such stimulation. In contrast, a non-packet based electromagnetic signal may be received by the disclosed sync pulse detector 10, converted into a digital signal, and transmitted to the receiving device 34 in approximately 1 millisecond, greatly increasing the accuracy of synchronization. It should be understood that the above example of synchronizing electrical stimulation of a patient's spinal cord to resulting muscle contractions is not intended to be limiting, and the disclosed sync pulse detector and method of synchronization may be used with physiological responses other than muscle contractions and with implanted devices other than IPGs or components of a neurostimulation system.

While the discussed embodiments relate to generation and detection of electromagnetic signals, alternative embodiments may relate to generation of other transmittable signals, such as ultrasound signals, or signals from specific regions of the electromagnetic spectrum, such as radio frequency signals or infrared signals, from a signal generator implanted in a patient, and detection of such signals by a detector external to the patient.

In another embodiment, an inductive load modulated system could be used to eliminate power from being required by the implanted device for synchronization. An electric field may be generated externally, and a sync pulse generated by the sync pulse detector could be used to short a coil in the implanted device. The increased load from the shorting could be detected externally by the sync pulse detector, and then converted into a square wave or other digital signal for further transmission to a receiving device.

Various aspects of different embodiments of the present invention are expressed in paragraphs X1, X2, X3 and X4 as follows:

X1. One aspect of the present invention pertains to a sync pulse detector, including a housing, a receiver for receiving a non-packet based electromagnetic signal, a circuit within the housing, the circuit for converting the electromagnetic signal into a digital signal, and means for transmitting the digital signal from the sync pulse detector.

X2. Another aspect of the present invention pertains to a method for detecting an electromagnetic pulse, the method including providing an electromagnetic pulse generator implanted in a patient, providing a sync pulse detector external to the patent, generating a non-packet based electromagnetic pulse using the electromagnetic pulse generator, and detecting the electromagnetic pulse using the sync pulse detector.

X3. A further aspect of the present invention pertains to a method of synchronizing delivery of electrostimulation, the method including associating a sync pulse detector with an implanted device via electromagnetic induction, wherein the implanted device is implanted in a patient and wherein the implanted device is configured to deliver electrostimulation to the patient to elicit a response from the patient, transmitting an electromagnetic signal from the implanted device upon delivery of electrostimulation to the patient, receiving the electromagnetic signal by the sync pulse detector at a first time, detecting onset of the response from the patient at a second time, comparing the first time and the second time to synchronize delivery of electrostimulation.

Yet other embodiments pertain to any of the previous statements X1, X2, or X3 which are combined with one or more of the following other aspects.

Wherein the non-packet based electromagnetic signal is generated by a device implanted in a patient.

Wherein the non-packet based electromagnetic signal is generated by an implantable pulse generator.

Wherein the non-packet based electromagnetic signal is received by the sync pulse detector via induction.

Wherein the sync pulse detector is external to the patient.

Wherein the receiver is an inductive coil.

Wherein the inductive coil is inductively coupled to an electromagnetic pulse generator implanted in a patient.

Wherein the means for transmitting the digital signal is an electrical conductor extending between the sync pulse detector and a receiving device.

Wherein the non-packet based electromagnetic signal is a dedicated signal.

Wherein the non-packet based electromagnetic signal is an electric pulse generated by an implanted pulse generator.

Wherein the digital signal is a square wave.

Wherein the digital signal is a triangle wave.

Wherein the digital signal is a sawtooth wave.

Wherein the electromagnetic pulse generator is operatively coupled to an electrode array.

Wherein the method further comprises converting, by the sync pulse detector, the detected electromagnetic pulse into a digital signal.

Wherein the method comprises transmitting, by the sync pulse detector, the digital signal to a receiving device.

Wherein the method comprises transmitting the digital signal to a receiving device.

Wherein the receiving device is a technical user interface.

Wherein the receiving device is a general purpose computer.

Wherein the receiving device is a special purpose computer configured to control the implanted device.

Wherein said transmitting occurs via a wired connection between the sync pulse detector and the receiving device.

Wherein said transmitting occurs via an electrical conductor extending between the sync pulse detector and the receiving device.

Wherein the sync pulse generator includes a receiver inductively coupled to the electromagnetic pulse generator.

Wherein the method further comprises associating the sync pulse detector with a receiving device via an electrical conductor.

Wherein the method further comprises converting the electromagnetic signal into a digital signal and transmitting the digital signal to the receiving device.

Wherein transmitting the electromagnetic signal from the implanted device substantially upon delivery of electrostimulation to the patient includes transmitting the electromagnetic signal within 5 milliseconds of delivery of electrostimulation to the patient.

Wherein transmitting the electromagnetic signal from the implanted device substantially upon delivery of electrostimulation to the patient includes transmitting the electromagnetic signal within 2 milliseconds of delivery of electrostimulation to the patient.

Wherein transmitting the electromagnetic signal from the implanted device substantially upon delivery of electrostimulation to the patient includes transmitting the electromagnetic signal within about 1 millisecond of delivery of electrostimulation to the patient.

It should be appreciated by those skilled in the art that any block diagrams herein represent conceptual views of illustrative circuitry embodying principles of the invention. Further, in the circuits shown, additional elements may also be included as needed, or variations to the structure of the circuits may be made to achieve the same functional results as the illustrated circuits.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A sync pulse detector system for a patient, the sync pulse detector system comprising:
   a neurostimulator including an implantable electrode array, the neurostimulator being configured to
      provide a variety of electrical stimulations to the patient via the implantable electrode array,
      wirelessly transmit a plurality of non-packet based electromagnetic synchronization pulses such that each of the non-packet based electromagnetic synchronization pulses signifies a respective initiation of a respective one of the electrical stimulations, and
      not deliver the non-packet based electromagnetic synchronization pulses to the patient via the electrode array; and
   a sync pulse detector including
      a housing,
      a receiver being configured to receive the non-packet based electromagnetic synchronization pulses,
      a circuit within the housing and operably coupled to the receiver, the circuit being configured to convert the non-packet based electromagnetic synchronization pulses into respective digital signals, and
      a means, operably coupled to the circuit, for transmitting the digital signals from the sync pulse detector,
      wherein the sync pulse detector is configured to reside outside of the patient; and
   a receiving device operably coupled to the circuit and operably coupled to the neurostimulator, the receiving device being configured to
      receive the digital signals,
      receive physiological data corresponding to physiological responses of the patient to the electrical stimulations, and
      cause, based on the digital signals and the physiological data, a synchronization of the electrical stimulations to the physiological responses of the patient.

2. The sync pulse detector system of claim 1, wherein the receiver is an inductive coil.

3. The sync pulse detector system of claim 2, wherein the inductive coil is inductively coupled to the neurostimulator.

4. The sync pulse detector system of claim 1, wherein the digital signals are square waves.

5. The sync pulse detector system of claim 3, wherein the neurostimulator is entirely implantable.

6. The sync pulse detector system of claim 5, wherein the neurostimulator is configured to provide epidural stimulation to the patient via the electrode array.

7. The sync pulse detector system of claim 1, wherein the sync pulse detector is configured to transmit each of the digital signals from the sync pulse detector within approximately one millisecond of receiving a respective one of the non-packet based electromagnetic synchronization pulses.

8. The sync pulse detector system of claim 7, wherein the neurostimulator is entirely implantable.

9. The sync pulse detector system of claim 8, wherein the neurostimulator is configured to provide epidural stimulation to the patient via the electrode array.

10. The sync pulse detector system of claim 9, wherein the receiver is configured to cause the synchronization based on electromyogram data.

11. The sync pulse detector system of claim 9, wherein the receiver is configured to cause the synchronization based on blood pressure data.

* * * * *